April 9, 1940.  KARL-GUSTAV ALLSTRÖM  2,196,434
DEVICE FOR REGULATING THE SPEED OF ELECTRIC MOTORS
Filed Dec. 23, 1937  2 Sheets-Sheet 1

INVENTOR
KARL-GUSTAV ALLSTROM

BY
ATTORNEY.

April 9, 1940.  KARL-GUSTAV ALLSTRÖM  2,196,434
DEVICE FOR REGULATING THE SPEED OF ELECTRIC MOTORS
Filed Dec. 23, 1937  2 Sheets-Sheet 2

Inventor:
Karl-Gustav Allström
by
Attorney.

Patented Apr. 9, 1940

2,196,434

UNITED STATES PATENT OFFICE 2,196,434

DEVICE FOR REGULATING THE SPEED OF ELECTRIC MOTORS

Karl-Gustav Allström, Uster, Switzerland

Application December 23, 1937, Serial No. 181,360
In Germany December 30, 1936

2 Claims. (Cl. 171—221)

This invention relates to a device for regulating the speed and maintaining constant the actually adjusted number of revolutions of small electric motors.

In the driving motors for talking machines adjusting devices are known in which an adjustable centrifugal governor and a series resistance are employed. When using repulsion motors the regulation of the number of revolutions is effected by a brush adjustment instead of a resistance adjustment. The known arrangements are sufficient for talking machine motor drives, owing to the relatively small fluctuations in load and owing to the relatively small range of adjustment required. However, these known devices are not sufficient for the fluctuations in load occurring in the drive of sewing machines and the wide range of adjustments necessary for carrying out the different kinds of sewing work.

According to the invention the adjusting element of the centrifugal brake governor is connected with an adjusting element of the series resistance or brush device. It is thus possible for the seamstress by operating a single adjusting element to switch on the motor, adjust to the desired speed, to change over slowly or suddenly from the actually adjusted speed to a higher or lower speed, and finally, by a simple manipulation of this adjusting element to switch off the motor and to brake immediately. Consequently with the motor adjustment according to the invention it is possible to carry out all fine sewing machine work which hitherto could only be carried out with hand drive or pedal drive.

It has been found by experiment, that in practice a centrifugal adjustment is only necessary within the lower speed range, whereas the centrifugal adjustment can be dispensed with at high speeds.

Two embodiments of the invention are illustrated by way of example in the accompanying drawings, in which.

Figure 1:
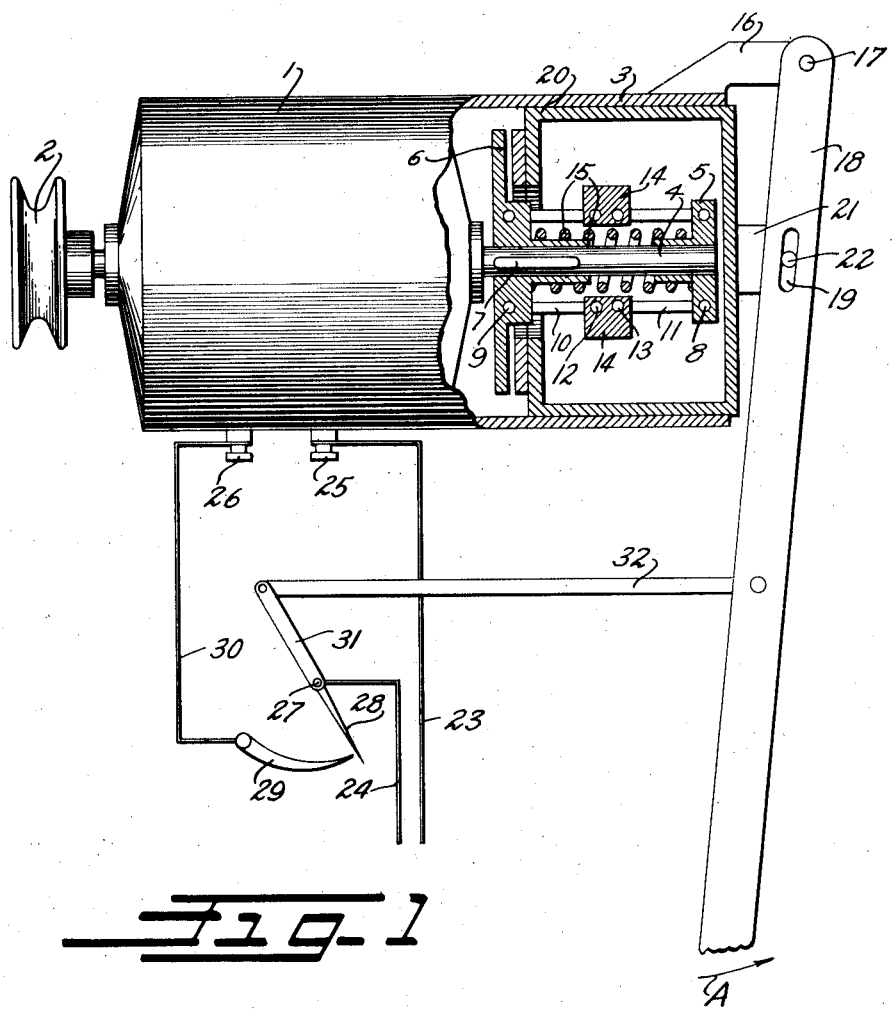
Fig. 1 shows a speed regulating device partly in elevation, partly in section.

A motor 1, in the example illustrated a series collector motor, drives, for example, a sewing machine by a belt from a grooved pulley. A cylindrical extension of the motor housing is constructed as guide casing 3 surrounding a centrifugal brake governor. A sleeve 5 is fixed, for example pinned, on the end of the motor shaft 4. A brake disc 6, whose hub has a keyway 7 in which a key engages is slidable on the shaft 4. Arms 11 and 10 are pivotally mounted at one end at 8 in the sleeve 5 and at 9 in the brake disc 6 respectively and at the other ends at 13 and 12 respectively in fly balls 14. A pressure spring 15 presses the brake disc 6 towards the motor, thereby extending the arms 10 and 11 so that they and the fly balls 14 assume the position shown in the drawings. The guide casing 3 has an arm 16, on which a control lever 18 provided with slot 19 is oscillatably mounted at 17. A drum-shaped brake block 20 is arranged in the guide casing 3 slidable in the axial direction of the motor. This block has a projection 21 carrying a pin 22 which engages in the slot 19 in the control lever 18.

Current is supplied to the motor by wires 23 and 24. The wire 23 is connected to one terminal 25 of the motor 1, whereas the wire 24 is connected to a contact arm 28 of a series resistance 29, diagrammatically shown in the drawings. A wire 30 extends from one end of the resistance 29 to the other terminal 26 of the motor. The contact arm 28 is pivoted at 27 on a lever 31, the free end of which lever is connected by a rod 32 with the control lever 18.

The device operates in the following manner:

For starting the motor the control lever 18 is swung in the direction of the arrow A until the contact arm 28 reaches the contact path of the resistance 29. At the same time the brake block 20 is shifted slightly in outward direction. When the motor has attained a certain speed, the fly-balls 14 swing outwards pressing the brake disc 6 against the brake block 20 through the intermediary of the arms 10 and 11. The friction between brake disc and brake block reduces the number of revolutions so that it does not attain the value which would correspond to the actual load and size of the series resistance. If the control lever 18 is swung further in the direction of the arrow A, the brake block 20 is shifted further towards the right away from the disc 6. Consequently the number of revolutions increases, the governor swings out farther until the brake disc 6 again bears against the brake block 20.

If, when the motor is under a certain load, a certain number of revolutions has been adjusted by means of the control lever 18, and if the load on the motor decreases, the number of revolutions and consequently the pressure and the friction between brake disc and brake block will increase until the reduction of load is compensated. If, on the other hand, the load on the motor increases, the number of revolutions begins to drop with the result that the pressure and consequently the friction between the brake disc and brake block will become less and the increase in load is compensated. It has been found in practice, that fluctuations in load result in such slight alterations of the speed actually adjusted that this may be regarded as almost constant.

Figure 2:
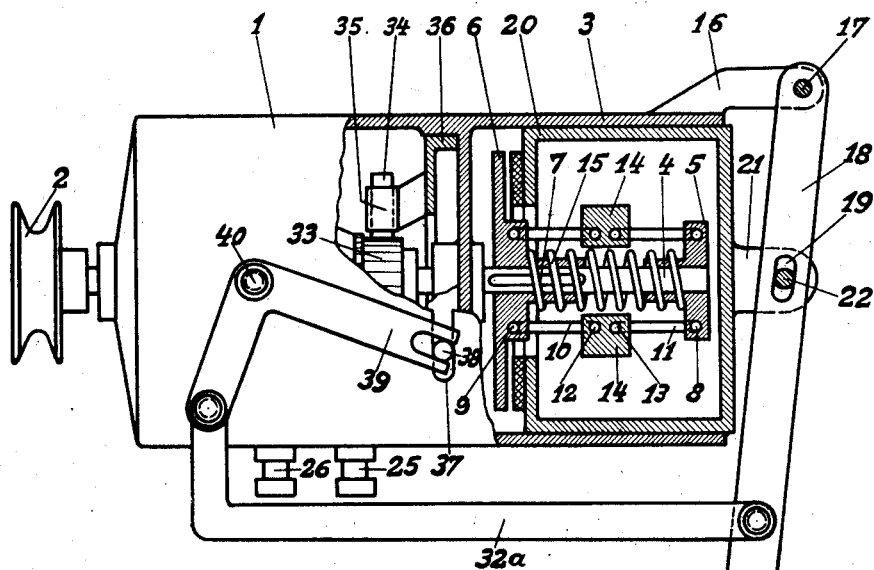
Fig. 2 shows a modified form of construction partly in elevation, and partly in section.
Figure 3:
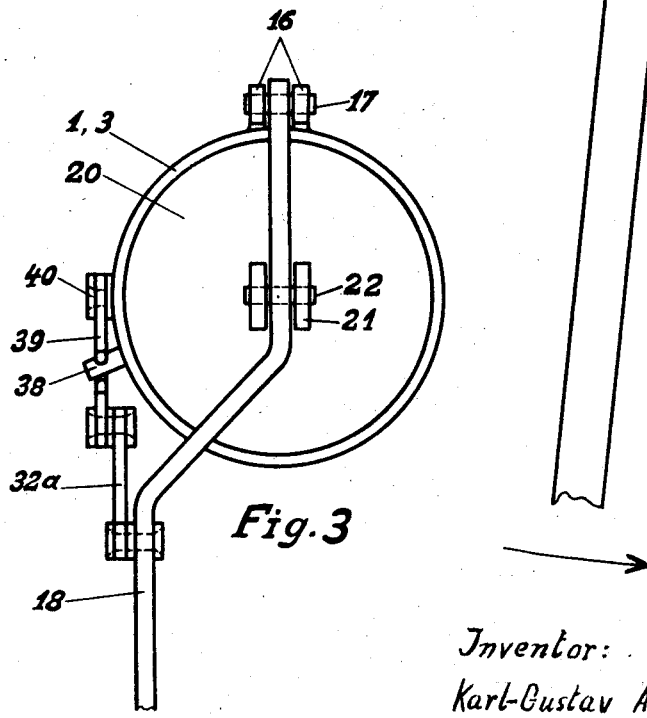
Fig. 3 is an end elevation viewed from the right of Fig. 2.

Figs. 2 and 3 show a repulsion motor with a regulating device mounted thereon. Brushes, of which the brush 34 is visible on the drawing, bear against the collector 33. The brush holders 35 are mounted on the brush gear 36 which is easily rotatable in the housing of the motor 1 concentric with the shaft 4. A catch pin 38 radially mounted on the brush carrier ring projects through a slot 37 in the housing wall and is engaged by a forked arm of the two-armed lever 39 oscillatably mounted on a pin 40 on the housing wall. A connecting rod 32a connects the other arm of the lever 39 to the control lever 18.

This device operates in a similar manner to that described in connection with the series motor already described. In the case of the series motor the resistance 29 is switched on and off with the aid of the connecting rod 32 when the control lever 18 is operated whereas in the case of the repulsion motor the two-armed lever 39 is oscillated through the intermediary of the connecting rod 32a and transmits the movement to the brush carrier ring 36 through the intermediary of the catch pin 38 and thus effects a shifting of the brushes 34 on the periphery of the collector 33. This brush displacement then influences the current taken up or the speed of the motor in known manner.

I claim:

1. A device for regulating the speed and maintaining constant the actually adjusted number of revolutions of small electric motors, comprising in combination means for changing the speed of the motor having an adjusting element, an adjustable centrifugal brake governor driven by the motor shaft and carrying an adjusting element, and a linkage connecting the adjusting element of said speed changing means with the adjusting element of said governor.

2. A device as specified in claim 1, in which the motor is a repulsion motor with shiftable brush holder said holder forming the means for changing the speed of the motor.

KARL-GUSTAV ALLSTRÖM.